June 1, 1926. 1,586,648
A. BOULADE
AUTOMATIC ALTIMETRIC CORRECTING APPARATUS FOR
CARBURETORS OF AIRCRAFT ENGINES
Filed Dec. 26, 1924 2 Sheets-Sheet 1

Inventor:
Antonin Boulade
By [signature]
Attorney

June 1, 1926. 1,586,648
A. BOULADE
AUTOMATIC ALTIMETRIC CORRECTING APPARATUS FOR
CARBURETORS OF AIRCRAFT ENGINES
Filed Dec. 26, 1924    2 Sheets-Sheet 2
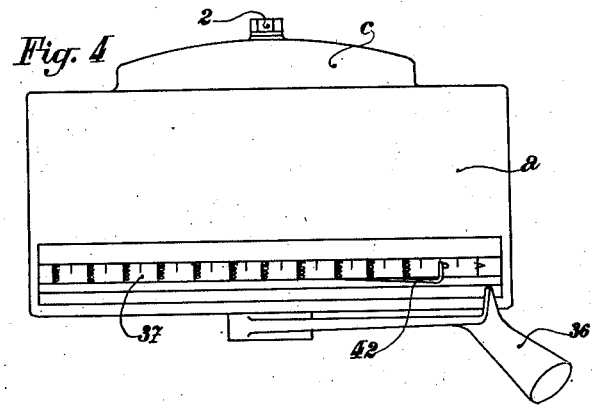
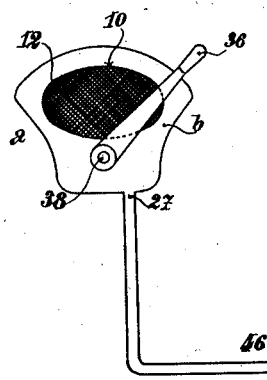
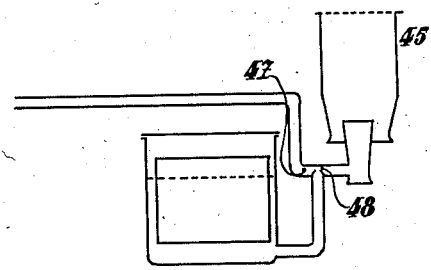
Inventor:
Antonin Boulade
By
Attorney Patented June 1, 1926.

1,586,648

UNITED STATES PATENT OFFICE.

ANTONIN BOULADE, OF LYON, FRANCE.

AUTOMATIC ALTIMETRIC CORRECTING APPARATUS FOR CARBURETORS OF AIRCRAFT ENGINES.

Application filed December 26, 1924, Serial No. 758,306, and in France December 26, 1923.

This invention relates to automatic altimetric correcting apparatus, for carburetors of aircraft engines.

In practice it is frequently desirable for the pilot to be able to operate the corrector system by hand; for example, in case of damage to the automatic corrector, or should the carburetor need special regulation, as a result, for instance, of overheating of the engine or bad ignition. Such a control would only be practicable if the pilot could instantly, without special manœuvering, change over from automatic to hand control, and vice versa.

According to the present invention I provide a correcting device which operates by admitting air to the carburetor at a rate which increases as the atmospheric pressure falls, comprising a valve, automatic means whereby the said valve is caused to open as the atmospheric pressure falls, a duct in communication with the said valve adapted to convey air therefrom to the carburetor, an auxiliary valve adapted to admit air to the duct, hand operated means whereby the said auxiliary valve can be actuated, a shut-off valve adapted to cut off the automatic valve from the duct when the auxiliary valve is in use, an altitude indicator actuated in conjunction with the automatically operated valve, and an index and a scale of altitudes or like device whereby the operator can set the opening of the auxiliary valve to correspond with the altitude.

Referring to the annexed drawing:

Figs. 1 to 4 show diagrammatically the general arrangement of one form of apparatus made in accordance with the invention, and, Fig. 5 shows one method of mounting the apparatus on a carburetor.

Fig. 1 is a sectional end elevation taken through the axis of the hand control lever.

Figs. 2 and 3 are sectional side elevations on lines A A and B B respectively of Fig. 1.

Fig. 4 is a plan;

Fig. 5 shows the installation of the apparatus in question.

Figure 2:
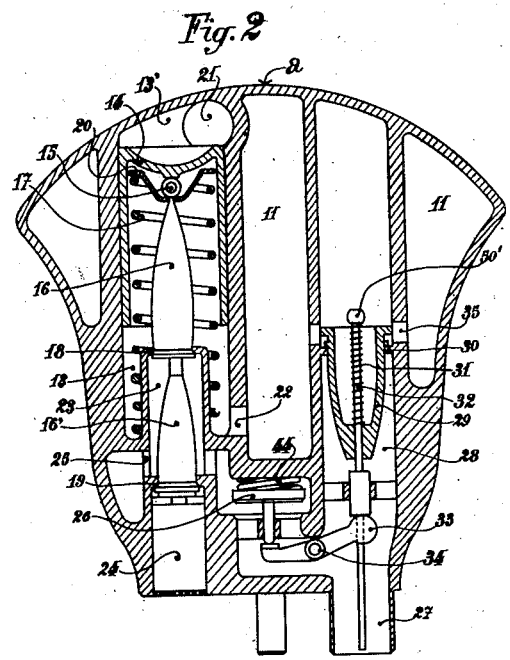

The parts constituting the apparatus in question are enclosed in a kind of box $a$ divided inside into several chambers by suitable partitions. The front side $b$ has an opening 10 closed by metallic gauze 12 for the purpose of filtering the atmospheric air which is to constantly fill the chamber 11. The rear side is hermetically sealed by a dome-shaped cover $c$ provided at its centre with a screwed stopper 2. An air-tight partition $d$ divides the box $a$ transversely and a diaphragm 4 again divides the space existing between $d$ and $c$ into two chambers 1, 3, having no communication between them.

In the space 11 between the partition $d$ and the side $b$ and constituting the chamber open to the atmosphere are disposed two cylinders 13 and 28 parallel to each other and occupying the entire height of the box $a$. These cylinders communicate with the chamber 11 by holes 22 and 35, (see Figs. 2 and 3). A piston 14 is disposed in the cylinder 13, closed at one end and connected by means of a ball joint 15 to the upper part of a double balanced valve 16, 16'.

Figure 1:
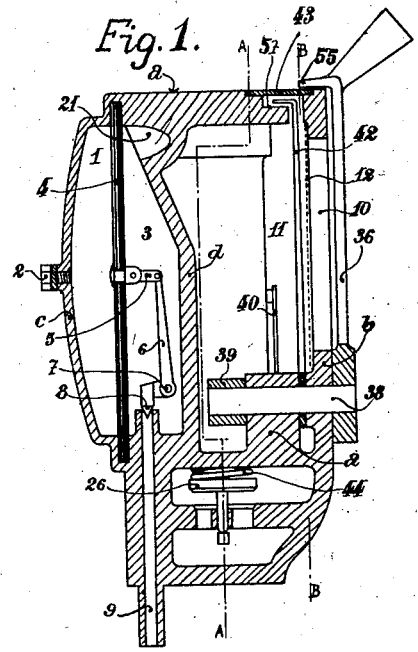

A helical spring 17, concentric with the double valve is supported on the one hand against the lower part of cylinder 13 and on the other hand against a "cup" 20 projecting below the ball joint 15. This spring returns the valves 16, 16' to their seatings and pushes back the piston 14 towards the top by means of the cup 20. The upper part 13' of cylinder 13 above the piston 14 communicates with the chamber 3 by a channel 21, (Figs. 1 and 2).

The base of cylinder 13 comprises a cylinder 23 of small diameter, the top of which forms a seating 18 for the upper valve 16, and which carries at one point of its length another seating 19 for the lower valve 16', (Fig. 2). Cylinder 23 communicates, through the valve seating 19, with an inlet 24 and with an air outlet 27 through holes 25 and by means of a distribution or shut-off valve 26. The air outlet 27 serves for feeding air to the carburetor for its correction and it is joined to this latter by a pipe such as 46 (Fig. 5).

In cylinder 28 is disposed an auxiliary as correction valve 29, held on its seating 30 by the spring 31 and controlled by the rod 32 which also serves as a guide for it. This rod itself controls, by means of the lever 33 oscillating on pin 34, the shut-off valve 26, which is returned to its seating by the spring 44. The holes 35, by means of the seating 30, serve for feeding air through duct 27 to the carburetor for correcting the operation of the same.

The chamber 1 is filled with air at atmospheric pressure or under pressure or by a gas at any pressure whatever which will be referred to as H0; the filling of this chamber is effected through the hole closed subsequently by the stopper 2.

The chamber 3 communicates with a compressor or a compressed air reservoir by a pipe 9, the orifice of which enters this chamber 3 and is closed by a small valve 8 integral with a bell crank lever 6, pivoted at 7 and connected by a small rod 5 to the centre of the diaphragm 4 (Fig. 1).

Figure 3:
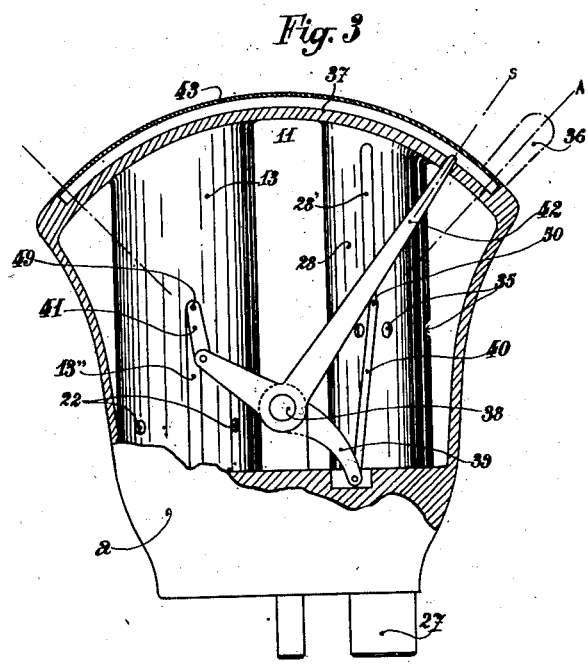

In Fig. 3 it is seen that the cylinder wall 13 has cut in it a vertical slot 13" traversed by a pin 49 fixed to the piston 14 and to a small rod 41 exterior to this cylinder 13. The rod 41 is pivoted to the small branch of a bell crank lever 42 which is loosely mounted on a pin or small rock shaft 38; the large branch of this lever constitutes an indicating needle the curved point of which travels along a graduated sector 37 indicating the altitude. This sector and the point of the needle are protected by a mica plate 43.

On the pin 38 are rigidly fixed the index control lever 36 and a lever 39 pivoted to a small rod 40, the opposite extremity of which carries a pin 50. The pin 50 traverses a vertical slot 28' in the cylinder wall 28 and is connected to the upper free extremity 50' of rod 32 to effect control thereof.

The operation of the apparatus is as follows:

When altimetric control is desired, compressed air is allowed to flow through channel 9 into chamber 3 until the pressure in said chamber overbalances that exerted on diaphragm 4 by the pressure H0 prevailing in the sealed chamber 1. As soon as that occurs, the diaphragm will be flexed outward automatically and will rock lever 6 in a direction to close valve 8, thus shutting off the air supply through channel 9 and producing in effect a state of equilibrium between the two chambers which will be constantly maintained thereafter, due to the fact that any subsequent losses of air from the pressure chamber 3 caused by possible leakage past the piston 14 and entailing a reduction of the pressure in that chamber will result in an inward flexion of the diaphragm and consequent reopening of the air supply valve 8. To all intents, therefore, this arrangement provides for a predetermined pressure (which is the pressure H0 prevailing in chamber 1) being constantly maintained in chamber 3; and since the latter chamber is in constant communication, through passage 21, with the chamber 13' formed between the top wall of cylinder 13 and the top of piston 14, it will be apparent that the aforesaid constant pressure likewise prevails in chamber 13' and is imposed upon the piston.

The under side of the piston is constantly exposed to atmospheric pressure, which is admitted through opening 10, chamber 11 and hole or holes 22, and in addition is subjected to the upward pressure of spring 17; and under normal conditions (as when the air ship is resting on the ground or is flying at very low altitudes) the combined effect of these two pressures is to overbalance the pressure H0 exerted on top of the piston and to maintain the latter in its raised position (Fig 2) with the automatic valve 16—16' is closed. When the ship ascends, however, the atmospheric pressure exerted against its under side, and which may be designated H1, gradually decreases, as will be understood, until a point is reached where the pressure at the top of the piston exceeds the pressure against its under side and the piston, in consequence, is forced downward, compressing spring 17 until its pressure is equal to H0—H1—that is, the difference between the initial pressure and the pressure at the altitude for the time being. This downward movement of the piston moves the valve 16—16' downward with it, thereby permitting the entrance of atmospheric air through inlet 24, holes 22, valve seats 18 and 19, holes 25 and duct 27 to the carburetor in the quantity required according to the altitude in which the ship is navigating.

When the ship descends, the atmospheric pressure H1 increases and, coupled with the pressure of spring 17, will in time overbalance pressure H0, whereupon the piston will be raised by the conjoint action of the two pressures specified and will carry valve 16—16' in the same direction, thus shutting off the air supply through duct 27 to the carburetor.

As previously stated, the bell-crank lever 42, which is loosely mounted on the pin or rock shaft 38, has one arm pivotally connected with the piston 14, so that during the vertical displacements of the latter the bell crank will swing about its pivot 38, its long arm traveling along the altitude scale 37 and thus constantly indicating the altitude.

For effecting the automatic connection of the air supply, as described above, the control lever 36 must occupy its "A" position, which is the one represented in Figs. 3 and 4. This lever, as has been explained, is keyed to the pin or rock shaft 38 on which the bell crank indicating lever 42 is loosely pivoted, due to which fact the movements of the two levers will take place independently of and relatively to each other, and neither will affect the other. The lever arm 39, on the contrary, is secured to pin 38, so that when the control lever 36 is shifted, its movement will be transmitted to said arm and thence through rod or link 40 to the head 50' of the stem 32 of the auxiliary or correction valve 29. The control lever is provided with a small finger or pointer 55 for cooperation with the altitude scale, and its "A" position is at one end of said scale and, hence, is an extreme position of the lever. In this position, the valve stem 32 is depressed to its lowest extent, and an enlarged portion 56 of said stem has engaged and rocked lever 33 clockwise (Fig. 2), thereby raising the distribution or shut-off valve 26 to open position against the action of spring 44, so that the communication duct 27 is entirely unblocked.

To isolate the automatic correction device from the air outlet 27, it is merely necessary to move the control lever from its "A" position to its "S" or ground position, which is that indicated by the dotted line S in Fig. 3. In moving to this latter position, the arm 39 is rocked counter-clockwise or upward and, of course, forces link 40 and valve stem 32 to move with it. This movement is so slight that stem 32 slides through valve 29, which is held against seat 30 by spring 31; but, on the other hand, the pressure transmitted to valve 26 by lever 33 is relieved, and said valve 26 is then forced downward to closed position by spring 44, thereby blocking the connection between cylinder 23 and duct 27, so that air can no longer pass by the valve from the cylinder 23 and its ports, though the piston 14 still continues to move, and its associated indicator 42 to register the altitude.

In case it is desired to control the supply of air from duct 27 to the carburetor entirely by hand, this can be done by moving the control lever 36 until its finger or pointer 55 indicates the proper figure on the altitude scale. The necessity for this manual control may arise for instance, in the event of an accident to the automatic control, in which case the altitude indication given by the main indicator 42 would no longer agree with that of the altimeter usually carried, which would, of course, be noticed by the pilot. In such case, the valve 26 would be in closed position, and the air would be supplied in the proper amount to the carburetor by moving the finger on the control lever to the figure given by the altimeter for the altitude at that moment; such movement of the lever raising the valve stem far enough to cause its enlarged portion or collar 56 to engage and pick up the auxiliary valve 29 and to carry it upward as the valve stem continues to ascend. As soon as the valve leaves its seat, an annular space or opening is formed which increases in exact accordance with the upward movement of the valve, and through this space or opening the air passes from the chamber 11 and the holes 35 and then flows through the duct 27 to the carburetor.

The mounting of the apparatus is illustrated diagrammatically in Fig. 5, wherein the carburetor to be corrected is indicated at 45 and is shown as having its Venturi passage 47 connected by a pipe or tube 46 to the outlet of the duct 27. The fuel nozzle 48, which leads from a float tank or the like, opens into the passage 47, so that the auxiliary air for correcting the delivery of the nozzle is thus supplied by the apparatus in accordance with the automatic or the hand control as above described, depending upon which one is in use.

By reason of the depression which may exist in cylinder 23 as a result of carburetor suction, the balance of the double valve 16—16' is obtained by the position of the holes 25 between the two valve seats 18 and 19 which are of equal section. In fact, from the suction being exercised in said cylinder from bottom to top thereof for the valve member 16', and from top to bottom for member 16, on equal sections of said members, there results the nullifying of the efforts exerted in an inverse direction. Consequently, the aforesaid depression does not influence in any way the opening of the double valve and, hence, the displacement of the piston 14 which operates solely by reason of the altitude; the sensitiveness of the piston being thereby preserved.

The apparatus hereinabove described can serve for the correction of carburetors of various types, and it can be arranged horizontally as well as vertically. The particular device for maintaining a constant pressure in the pressure chamber can be replaced by any other suitable device which will serve the same purpose, and any suitable liquid may be used instead of compressed air or other gaseous fluid to create such pressure.

Having now described my invention, what I claim as new and desire to secure by Letters Patent is:

1. A correcting attachment for carburetors which operates by admitting air to the carburetor in amounts increased as the atmospheric pressure falls, comprising a valve, automatic means whereby the said valve is caused to open as the atmospheric pressure falls, a duct in communication with the said valve adapted to convey air therefrom to the carburetor, an auxiliary valve adapted to admit air to the duct, hand operated means whereby the said auxiliary valve can be actuated, a shut-off valve adapted to cut off the automatic valve from the duct when the auxiliary valve is in use, an altitude indicator actuated in conjunction with the automatically operated valve, and adjustable indicating means whereby the operator can set the opening of the auxiliary valve to correspond with the altitude.

2. An altimetric correcting device, comprising a pressure chamber; automatically-acting mechanism for constantly maintaining a predetermined pressure therein; a cylinder communicating at its upper end with said chamber; a piston movable in said cylinder and subjected at its upper part to the constant pressure prevailing in the pressure chamber; a spring in said cylinder tending to raise the piston; and adapted to be compressed by the same when the exterior pressure at the base of the piston decreases; and a valve controlled directly by the displacement of the piston and adapted to be returned to its closed position as the pressure increases.

3. In a correcting attachment for carburetors, a casing; a chamber therein; a flexible diaphragm in said chamber dividing it into two compartments, in one of which a body of air is permanently sealed and the other of which has an outlet through which air may pass; an inlet pipe for supplying compressed air to the second-named compartment; a valve in said second-named compartment for closing the mouth of said pipe; and connections between said valve and said diaphragm for transmitting the flexion of the latter to the valve to open the same when the pressure in the second-named compartment falls below that in the first-named compartment.

4. A correcting attachment for carburetors, comprising a valve; means including a piston connected with said valve for automatically displacing it as the atmospheric pressure varies; a duct in communication with the valve for conveying air to the carburetor; an auxiliary valve for admitting air to the duct; hand-operated means for actuating the auxiliary valve; a shut-off valve for cutting off the automatic valve from the duct when the auxiliary valve is in use; an altitude scale; and an indicator movable along said scale and connected with the piston to be automatically operated by its displacements.

5. A correcting attachment for carburetors, comprising a valve; means including a piston connected with said valve for automatically displacing it as the atmospheric pressure varies; a duct in communication with the valve for conveying air to the carburetor; an auxiliary valve for admitting air to the duct; hand-operated means for actuating the auxiliary valve; a shut-off valve for cutting off the automatic valve from the duct when the auxiliary valve is in use; an altitude scale; an indicator movable along said scale and connected with the piston to be automatically operated by its displacements; and adjustable indicating means for setting the opening of the auxiliary valve to correspond with the altitude.

6. An automatic altimetric correcting device, comprising a pressure chamber; means for constantly maintaining a predetermined pressure therein; a cylinder communicating at its upper end with said chamber; a piston movable in said cylinder and subjected at its upper part to the constant pressure prevailing in the pressure chamber; a spring in said cylinder tending to raise the piston and adapted to be compressed by the same when the exterior pressure at the base of the piston decreases; an altitude scale; an indicator movable along said scale and connected with the piston to be automatically operated by its displacements; a valve controlled directly by the displacement of the piston and adapted to be returned by said spring to its closed position as the pressure in said piston increases; and an air supply duct controlled by said valve.

7. A correcting attachment for carburetors, comprising a casing; a valve therein; a duct controlled by said valve for supplying air to the carburetor; automatically-operating means for controlling said valve in accordance with variations in atmospheric pressure; a hand-actuated correcting system for said valve operable alternately with the automatic operating means; and connections between the hand-actuated system and the automatic operating means for cutting out the other when either is put into use.

8. An altimetric correcting device, comprising a pressure chamber; means for constantly maintaining a predetermined pressure therein; a cylinder communicating at its upper end with said chamber; a piston movable in said cylinder and subjected at its upper part to the constant pressure prevailing in the pressure chamber; a spring in said cylinder tending to raise the piston and adapted to be compressed by the same when the exterior pressure at the base of the piston decreases; and a valve controlled directly by the displacement of the piston and adapted to be returned to its closed position as the pressure increases.

In witness whereof I have signed this specification.

ANTONIN BOULADE.